(12) United States Patent
Ito (10) Patent No.: US 9,709,996 B2
(45) Date of Patent: Jul. 18, 2017

(54) BOAT MANEUVERING SYSTEM (71) Applicant: YAMAHA HATSUDOKI KABUSHIKI KAISHA, Iwata-shi, Shizuoka (JP)

(72) Inventor: Makoto Ito, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/163,143

(22) Filed: May 24, 2016

(65) Prior Publication Data
US 2016/0349767 A1  Dec. 1, 2016

(30) Foreign Application Priority Data

May 25, 2015 (JP) .................... 2015-105205
Nov. 4, 2015 (JP) .................... 2015-216599

(51) Int. Cl.
G05D 13/00 (2006.01)
B63H 20/00 (2006.01)
B63H 20/20 (2006.01)
B63H 20/14 (2006.01)

(52) U.S. Cl.
CPC ............ G05D 13/00 (2013.01); B63H 20/00 (2013.01); B63H 20/007 (2013.01); B63H 20/20 (2013.01)

(58) Field of Classification Search
None
See application file for complete search history.

(56) References Cited

U.S. PATENT DOCUMENTS

| 6,884,128 | B2* | 4/2005 | Okuyama | ............ | B63H 21/21 440/1 |
| 7,052,341 | B2* | 5/2006 | Kaji | ............... | B63H 23/30 440/75 |
| 7,238,071 | B2 | 7/2007 | Takada et al. | | |
| 8,043,132 | B1* | 10/2011 | Wyant | ............... | B63H 21/20 440/1 |
| 8,078,347 | B2* | 12/2011 | Minoura | ............... | B63H 20/20 440/1 |
| 8,092,264 | B2* | 1/2012 | Kinoshita | ............ | B63H 21/213 440/1 |
| 8,340,847 | B2* | 12/2012 | Sako | ............... | B63H 21/21 701/21 |
| 2006/0009096 | A1* | 1/2006 | Takada | ............... | B63H 21/213 440/84 |
| 2011/0294376 | A1* | 12/2011 | Kuriyagawa | ......... | B63H 20/14 440/86 |

FOREIGN PATENT DOCUMENTS

| EP | 2 727 817 A1 | 5/2014 |
| JP | 2004-142538 A | 5/2004 |
| JP | 2005-145439 A | 6/2005 |
| JP | 2006-21557 A | 1/2006 |
| JP | 2008-155894 A | 7/2008 |
| JP | 2010-203416 A | 9/2010 |
| JP | 5008747 B2 | 8/2012 |

* cited by examiner

Primary Examiner — Krishnan Ramesh
(74) Attorney, Agent, or Firm — Keating and Bennett, LLP (57) ABSTRACT

A boat maneuvering system includes an actuator controller that performs intermittent control of switching a shift state alternately to a shift-in state and a neutral state by a shift actuator when a throttle opening degree of a propulsion device is an idling opening degree in the shift-in state and a detected actual boat speed is larger than a target boat speed for a first period of time or more in an auto cruise mode.

20 Claims, 8 Drawing Sheets

FIG.1
FIRST PREFERRED EMBODIMENT

NORMAL MODE

*FIG.5*

AUTO CRUISE MODE

FIG.9
SECOND PREFERRED EMBODIMENT

FIG.10    CONTROL OPERATION (AUTO CRUISE MODE)

BOAT MANEUVERING SYSTEM

CROSS-REFERENCE TO RELATED APPLICATION

This application claims priority to Patent Application No. 2015-216599 filed in Japan on Nov. 4, 2015 and priority to Patent Application No. 2015-105205 filed in Japan on May 25, 2015, the entire contents of which are hereby incorporated by reference.

BACKGROUND OF THE INVENTION

1. Field of the Invention

The present invention relates to a boat maneuvering system.

2. Description of the Related Art

A boat maneuvering system is known in general. Such a boat maneuvering system is disclosed in Japanese Patent Laid-Open No. 2005-145439, for example.

Japanese Patent Laid-Open No. 2005-145439 discloses a propulsion power control device (boat maneuvering system) including a target propulsion power acquisition means that acquires target propulsion power generated by a propulsion device and a clutch control means that controls a clutch mechanism based on the acquired target propulsion power. The propulsion power control device according to Japanese Patent Laid-Open No. 2005-145439 performs intermittent coupling control of intermittently coupling the clutch mechanism when a target rotational speed based on a continuous boat maneuvering operation of a user is smaller than the lower limit of the rotational speed of the propulsion device at low speed.

In the propulsion power control device (boat maneuvering system) according to Japanese Patent Laid-Open No. 2005-145439, when the user desires to keep the target rotational speed smaller than the lower limit of the rotational speed of the propulsion device at low speed, it is necessary for the user to continuously perform a boat maneuvering operation in order to perform the intermittent coupling control of intermittently coupling the clutch mechanism. Consequently, it is necessary for the user to perform an operation of subtly changing the target rotational speed at low speed. Thus, a boat maneuvering system that enables the user to easily and subtly control a boat speed at low speed is desired.

SUMMARY OF THE INVENTION

Preferred embodiments of the present invention provide a boat maneuvering system that enables a user to easily and subtly control a boat speed at low speed.

A boat maneuvering system according to a first preferred embodiment of the present invention includes a target boat speed selector that sets the target boat speed of a boat, an actual boat speed detector that detects the actual boat speed of the boat, a throttle actuator that changes the throttle opening degree of a propulsion device, a shift actuator that switches a shift state, a shift position detector that detects the shift position of the propulsion device, a throttle opening degree detector that detects the throttle opening degree of the propulsion device, and an actuator controller that controls the throttle actuator and the shift actuator such that the actual boat speed reaches the target boat speed. The actuator controller performs intermittent control of switching the shift state alternately to a shift-in state and a neutral state by the shift actuator when the throttle opening degree of the propulsion device is an idling opening degree in the shift-in state and the detected actual boat speed is larger than the target boat speed for a first period of time or more in an auto cruise mode of automatically controlling a boat speed.

The boat maneuvering system according to the first preferred embodiment of the present invention is provided with the actuator controller that is configured or programmed to perform the intermittent control of switching the shift state alternately to the shift-in state and the neutral state by the shift actuator when the throttle opening degree of the propulsion device is the idling opening degree in the shift-in state and the detected actual boat speed is larger than the target boat speed for the first period of time or more in the auto cruise mode of automatically controlling the boat speed. Thus, even when the target boat speed is less than a boat speed at the idling opening degree in the auto cruise mode requiring no continuous boat maneuvering operation of a user, the boat speed is controlled, and hence it is not necessary for the user to perform an operation of subtly changing the setting at low speed. Consequently, the boat speed is easily and subtly controlled at low speed. Thus, in the auto cruise mode, the boat speed is automatically controlled in a wide range from high speed to extremely low speed. Furthermore, the intermittent control is performed when the detected actual boat speed is larger than the target boat speed for the first period of time or more, and hence repetition of execution and cancellation of the intermittent control (chattering) is significantly reduced or prevented when the actual boat speed is slightly increased and decreased in the vicinity of the target boat speed.

In the boat maneuvering system according to the first preferred embodiment of the present invention, during the intermittent control, the actuator controller preferably adjusts a shift-in time such that the actual boat speed reaches the target boat speed. Accordingly, propulsion power is controlled by adjusting a ratio of the shift-in time and the neutral time during the intermittent control, and hence a boat speed less than the boat speed at the idling opening degree is accurately controlled.

In this case, the intermittent control is preferably canceled when the shift-in time is at least a certain value and the detected actual boat speed is smaller than the target boat speed for a second period of time or more during the intermittent control. Accordingly, the intermittent control is canceled when the detected actual boat speed is smaller than the target boat speed for the second period of time or more, and hence frequent repetition of execution and cancellation of the intermittent control (chattering) is significantly reduced or prevented when the actual boat speed is slightly increased and decreased in the vicinity of the target boat speed.

In the structure in which the shift-in time is adjusted during the intermittent control, the actuator controller preferably performs control of gradually varying the shift-in time to a target shift-in time when performing the intermittent control. Accordingly, the actual boat speed is gradually changed, and hence the actual boat speed is smoothly brought close to the target boat speed.

In this case, the actuator controller preferably performs control of gradually decreasing the shift-in time from a maximum value to the target shift-in time when performing the intermittent control. Accordingly, the actual boat speed is gradually decreased to the target boat speed so as to be smoothly brought close to the target boat speed.

In the boat maneuvering system according to the first preferred embodiment of the present invention, the actuator controller preferably performs control of gradually changing the throttle opening degree to a target throttle opening degree when canceling the intermittent control. Accordingly, the actual boat speed is gradually changed when the intermittent control is canceled, and hence the actual boat speed is smoothly brought close to the target boat speed.

In this case, the actuator controller preferably performs control of gradually increasing the throttle opening degree from the idling opening degree to the target throttle opening degree when canceling the intermittent control. Accordingly, when the intermittent control is canceled, the actual boat speed is gradually increased to or close to the target boat speed.

In the boat maneuvering system according to the first preferred embodiment of the present invention, the target boat speed in the auto cruise mode is preferably set by a user's operation. Accordingly, the boat travels at a boat speed desired by the user in the auto cruise mode.

In this case, the target boat speed set by the user's operation in the auto cruise mode is preferably variable by the user's operation of a speed-up/speed-down command receiver. Accordingly, the target boat speed in the auto cruise mode is easily varied by the operation of the speed-up/speed-down command receiver.

In the structure in which the target boat speed in the auto cruise mode is set by the user, the range of the target boat speed in the auto cruise mode that is set based on the position of a remote control through which the throttle opening degree of the propulsion device is manipulated is preferably limited. Accordingly, a rapid fluctuation in the boat speed is significantly reduced or prevented when the auto cruise mode is canceled.

In the boat maneuvering system according to the first preferred embodiment of the present invention, the actual boat speed detector preferably includes a GPS receiver and detects the actual boat speed based on the position of the boat detected by the GPS receiver. Accordingly, the actual boat speed is accurately detected by the GPS receiver.

In the boat maneuvering system according to the first preferred embodiment of the present invention, the auto cruise mode is preferably canceled when a remote control through which the throttle opening degree of the propulsion device is manipulated is operated more than a predetermined value or a mode off button is operated. Accordingly, the auto cruise mode is easily canceled by the operation of the remote control or the operation of the mode off button.

In this case, the actuator controller preferably controls the throttle actuator and the shift actuator to adjust the throttle opening degree and the shift position according to the position of a remote control when the auto cruise mode is canceled during the intermittent control. Accordingly, a quick shift to control of the boat speed according to the position of the remote control is made when the auto cruise mode is canceled during the intermittent control.

In the structure in which the throttle opening degree and the shift position are adjusted according to the position of the remote control when the auto cruise mode is canceled during the intermittent control, the actuator controller preferably performs control of gradually increasing the throttle opening degree if a difference between the throttle opening degree corresponding to the position of the remote control and an actual throttle opening degree is at least a predetermined value when the auto cruise mode is canceled during the intermittent control. Accordingly, a rapid fluctuation in the boat speed is significantly reduced or prevented when the auto cruise mode is canceled during the intermittent control.

A boat maneuvering system according to a second preferred embodiment of the present invention includes a target boat speed selector that sets the target boat speed of a boat, an actual boat speed detector that detects the actual boat speed of the boat, a throttle actuator that changes the throttle opening degree of a propulsion device, a shift actuator that switches a shift state, a shift position detector that detects the shift position of the propulsion device, a throttle opening degree detector that detects the throttle opening degree of the propulsion device, and an actuator controller configured or programmed to control the throttle actuator and the shift actuator such that the actual boat speed reaches the target boat speed. The actuator controller is configured or programmed to perform intermittent control of switching the shift state alternately to a shift-in state and a neutral state by the shift actuator when an instruction to shift to an auto cruise mode of automatically controlling a boat speed is input in the neutral state.

The boat maneuvering system according to the second preferred embodiment of the present invention is provided with the actuator controller that performs the intermittent control of switching the shift state alternately to the shift-in state and the neutral state by the shift actuator when the instruction to shift to the auto cruise mode of automatically controlling the boat speed is input in the neutral state. Thus, even when the target boat speed is less than a boat speed at the idling opening degree in the auto cruise mode requiring no continuous boat maneuvering operation of a user, the boat speed is controlled, and hence it is not necessary for the user to perform an operation of subtly changing the setting at low speed. Consequently, the boat speed is easily and subtly controlled at low speed.

In the boat maneuvering system according to the second preferred embodiment of the present invention, the actuator controller preferably performs control of switching alternately between the shift-in state in a first direction or the shift-in state in a second direction opposite to the first direction and the neutral state in the intermittent control. Accordingly, even when the actual boat speed is made larger than the target boat speed due to water flow, wind, or the like in the first direction, the propulsive direction of the boat is set to the second direction opposite to the first direction, and hence the boat speed is accurately controlled.

In this case, the actuator controller preferably switches the shift state to the second direction if the actual boat speed in the first direction is larger than the target boat speed when performing the intermittent control of switching alternately between the shift-in state in the first direction and the neutral state, or performing control of continuing the neutral state. Accordingly, when the propulsion power of the boat in the first direction is decreased but the actual boat speed is still larger than the target boat speed, the propulsive direction of the boat is set to the second direction opposite to the first direction, and hence the boat speed is easily and accurately controlled.

In the structure in which the shift state is switched to the second direction if the actual boat speed in the first direction is larger than the target boat speed, the actuator controller preferably continues the shift-in state in the second direction if the actual boat speed in the first direction is larger than the target boat speed even when switching the shift state to the second direction and performing the intermittent control of switching alternately between the shift-in state in the second direction and the neutral state. Accordingly, the propulsion power of the boat in the second direction is increased by switching the intermittent control to control of continuing the shift-in state, and hence the boat speed is accurately controlled even when the influence of water flow, wind, or the like in the first direction is large.

In the structure in which the shift state is switched to the second direction if the actual boat speed in the first direction is larger than the target boat speed, the actuator controller preferably switches the shift state to the neutral state or the first direction if the actual boat speed in the first direction is smaller than the target boat speed when switching the shift state to the second direction. Accordingly, the propulsion power of the boat in the second direction is eliminated when the direction or magnitude of water flow or wind is changed, and hence the boat speed is accurately controlled according to changing circumstances such as the water flow and the wind.

In the boat maneuvering system according to the second preferred embodiment of the present invention, the target boat speed is able to be set to a value for the first direction that is a forward movement direction, zero, and a value for the second direction that is a reverse movement direction. Accordingly, the degree of freedom of setting the target boat speed is increased as compared with the case where the target boat speed is set only to the value for the first direction that is the forward movement direction.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention are hereinafter described with reference to the drawings.

First Preferred Embodiment

The structure of a boat 1 including a boat maneuvering system 100 according to a first preferred embodiment of the present invention is now described with reference to FIG. 1. In the figures, arrow FWD represents the forward movement direction of the boat 1, and arrow BWD represents the reverse movement direction of the boat 1. In the figures, arrow R represents the starboard direction of the boat 1, and arrow L represents the portside direction of the boat 1.

Figure 1:
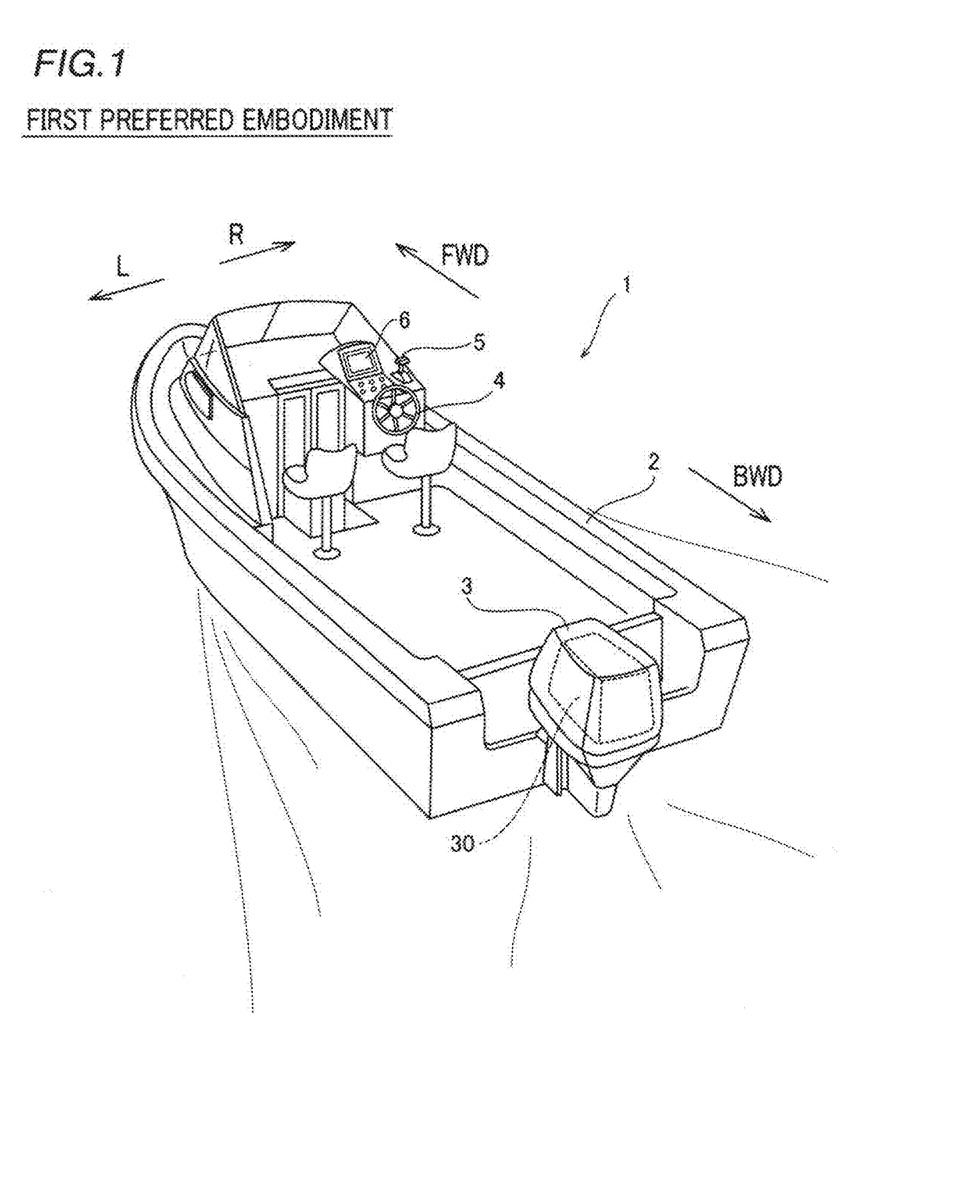
FIG. 1 is a diagram schematically showing a boat including a boat maneuvering system according to a first preferred embodiment of the present invention.
Figure 2:
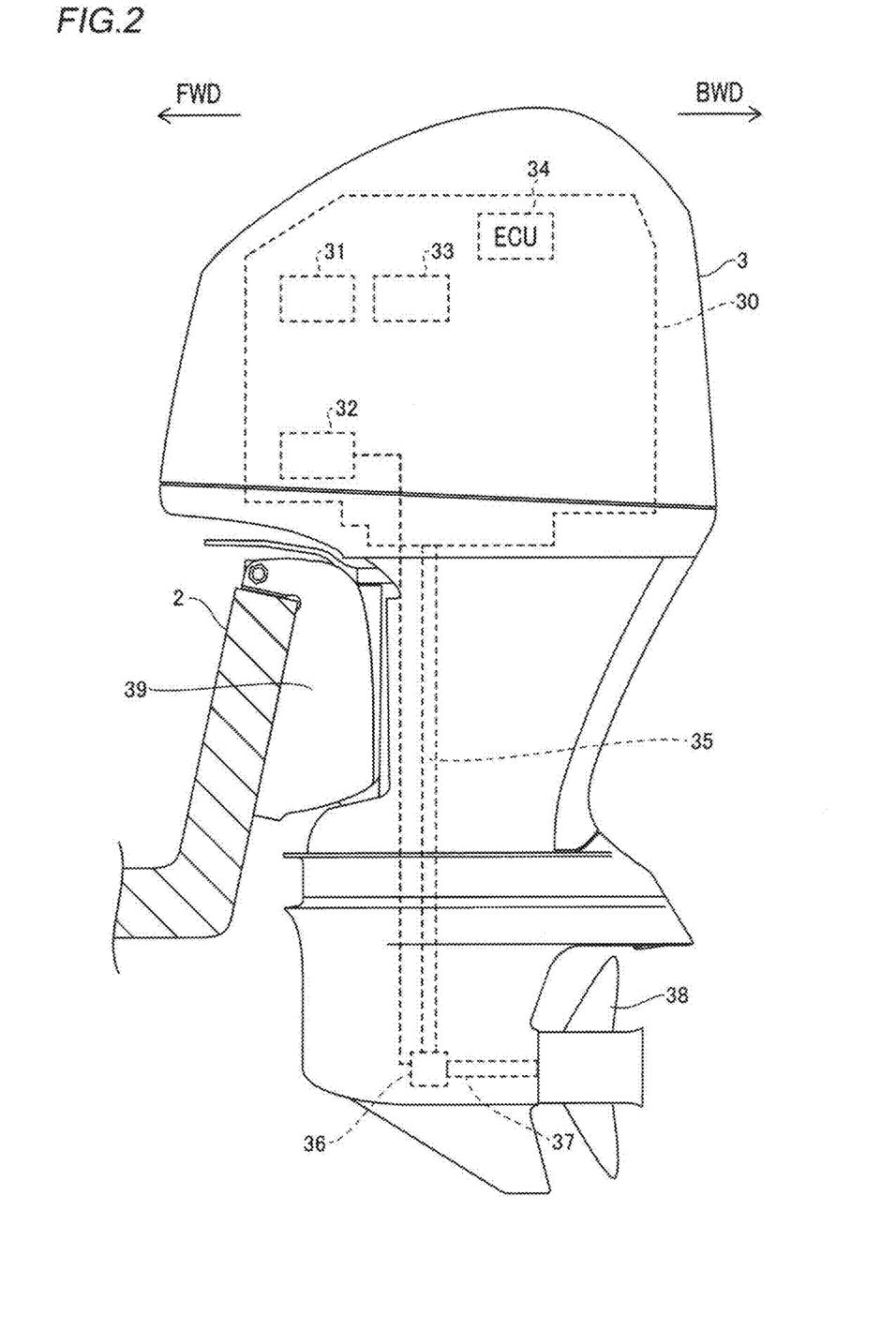
FIG. 2 is a side elevational view schematically showing an outboard motor controlled by the boat maneuvering system according to the first preferred embodiment of the present invention.
Figure 3:
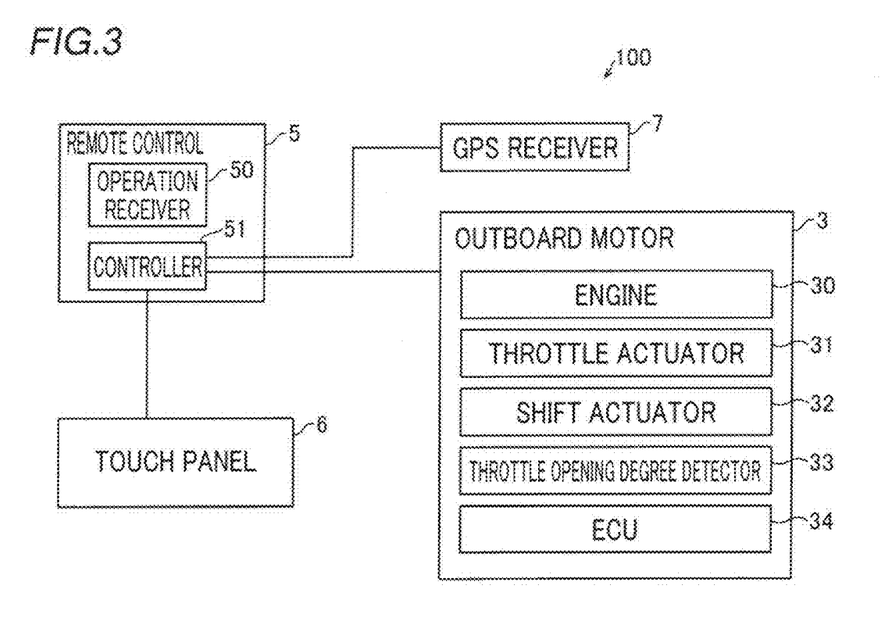
FIG. 3 is a block diagram schematically showing the boat maneuvering system according to the first preferred embodiment of the present invention.

The boat 1 includes a boat body 2, an outboard motor 3, a steering wheel 4, a remote control 5, a touch panel 6, and a GPS (global positioning system) receiver 7 (see FIG. 3), as shown in FIG. 1. As shown in FIG. 2, the outboard motor 3 includes an engine 30, a throttle actuator 31, a shift actuator 32, a throttle opening degree detector 33, and an ECU (engine control unit) 34. As shown in FIG. 3, the remote control 5 includes an operation receiver 50 and a controller 51. The outboard motor 3 is an example of a "propulsion device" in the first preferred embodiment of the present invention. The GPS receiver 7 is an example of an "actual boat speed detector" in the first preferred embodiment of the present invention, and the controller 51 is an example of a "target boat speed selector" in the first preferred embodiment of the present invention. The shift actuator 32 is an example of a "shift actuator" or a "shift position detector" in the first preferred embodiment of the present invention. The ECU 34 is an example of an "actuator controller" in the first preferred embodiment of the present invention.

The outboard motor 3 is mounted on a rear portion of the boat body 2, as shown in FIG. 1. The outboard motor 3 further includes a drive shaft 35, a gearing 36, a propeller shaft 37, and a propeller 38, and a bracket 39, as shown in FIG. 2. The outboard motor 3 is mounted on the boat body 2 so as to be rotatable about each of a vertical axis and a horizontal axis by the bracket 39.

The engine 30 is provided in an upper portion of the outboard motor 3 and includes an internal combustion driven by explosive combustion of gasoline, light oil, or the like. The engine 30 is covered by an engine cover. The throttle actuator 31 is arranged in the vicinity of the engine 30. The throttle actuator 31 changes the throttle opening degree of the outboard motor 3 (engine 30).

The shift actuator 32 is arranged in the vicinity of the engine 30. The shift actuator 32 switches the shift state of the outboard motor 3. Specifically, the shift actuator 32 changes the shift position to any of forward movement, reverse movement, and neutral. The shift actuator 32 changes the meshing of the gearing 36 and switches the shift state. The shift actuator 32 detects the shift position.

The throttle opening degree detector 33 is arranged in the vicinity of the engine 30. The throttle opening degree detector 33 detects the throttle opening degree of the engine 30. The ECU 34 is arranged in the vicinity of the engine 30. The ECU 34 is configured or programmed to control the driving of the engine 30. Specifically, the ECU 34 is configured or programmed to control the throttle actuator 31 and the shift actuator 32 so as to control the driving of the engine 30.

The drive shaft 35 is coupled to the crankshaft of the engine 30 so as to transmit the power of the engine 30. The drive shaft 35 extends in a vertical direction. The gearing 36 is arranged in a lower portion of the outboard motor 3. The gearing 36 decreases the rotational speed of the drive shaft 35 and transmits the decreased rotational speed to the propeller shaft 37. In other words, the gearing 36 transmits the drive force of the drive shaft 35 that rotates about a rotation axis extending in the vertical direction to the propeller shaft 37 that rotates about a rotation axis extending in a front to back direction.

Specifically, the gearing 36 includes a pinion gear, a forward movement bevel gear, a reverse movement bevel gear, and a dog clutch. The pinion gear is mounted on a lower end of the drive shaft 35. The forward movement bevel gear and the reverse movement bevel gear are provided on the propeller shaft 37 to hold the pinion gear therebetween. The pinion gear meshes with the forward movement bevel gear and the reverse movement bevel gear. The gearing 36 switches between a state where the dog clutch that rotates integrally with the propeller shaft 37 engages with the forward movement bevel gear and a state where the dog clutch engages with the reverse movement bevel gear so as to switch the shift position (the rotation direction, the forward movement direction and the reverse movement direction, of the propeller shaft 37). The gearing 36 switches to a state where the dog clutch engages with neither the forward movement bevel gear nor the reverse movement bevel gear so as to change the shift position to neutral. The meshing of the gearing 36 is changed by the shift actuator 32 such that the shift position is switched to the forward movement direction, reverse movement direction, or neutral.

The propeller 38 (screw) is connected to the propeller shaft 37. The propeller 38 is driven to rotate about the rotation axis extending in the front to back direction. The propeller 38 rotates in water to generate thrust force in an axial direction. The propeller 38 moves the boat body 2 forward or reversely according to the rotation direction.

The steering wheel 4 steers the boat body 2 (turns the outboard motor 3). Specifically, the steering wheel 4 is connected to a turning device of the outboard motor 3. The turning device rotates the outboard motor 3 in a horizontal direction based on the operation of the steering wheel 4.

The remote control 5 manipulates the shift state and output (throttle opening degree) of the outboard motor 3. Specifically, the remote control 5 is connected to the outboard motor 3. The output and shift state (forward movement, reverse movement, or neutral) of the engine 30 of the outboard motor 3 are controlled based on the operation of the operation receiver 50 of the remote control 5.

Figure 4:
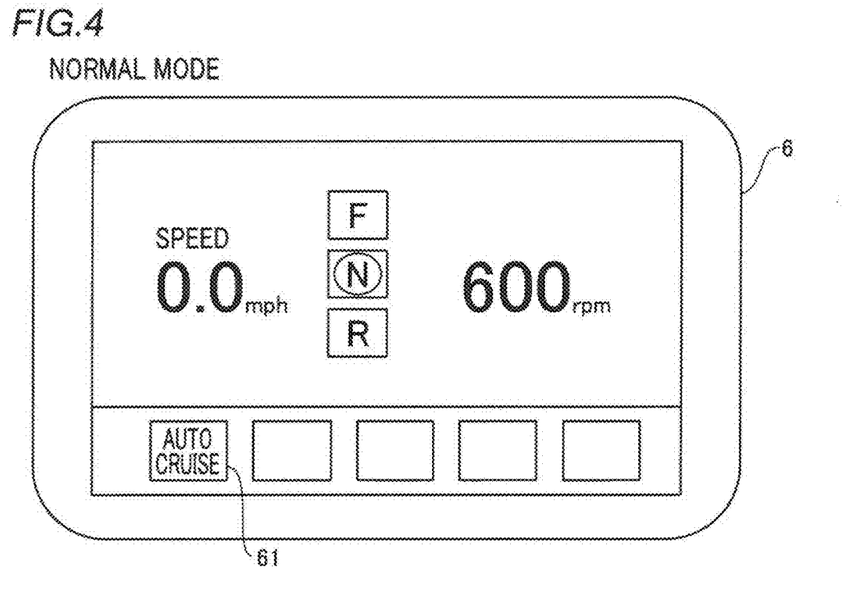
FIG. 4 is a diagram showing an example display on a touch panel in a normal mode of the boat maneuvering system according to the first preferred embodiment of the present invention.
Figure 5:
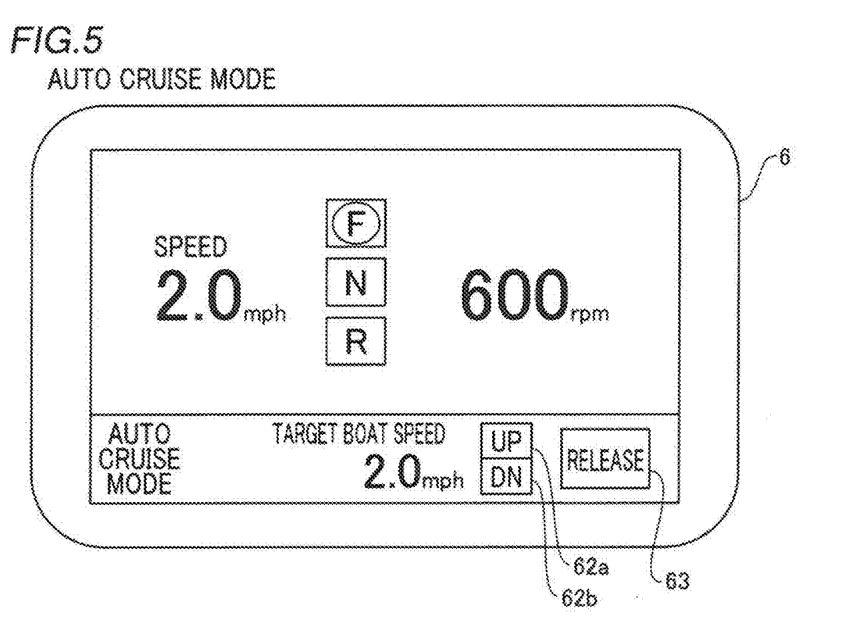
FIG. 5 is a diagram showing an example display on the touch panel in an auto cruise mode of the boat maneuvering system according to the first preferred embodiment of the present invention.

As shown in FIGS. 4 and 5, the touch panel 6 is used to manipulate the movement of the boat body 2 and to select and switch a mode of the operating state of the boat 1. The touch panel 6 displays information about the boat 1. The touch panel 6 displays information such as the boat speed of the boat 1, the rotational speed of the engine 30, the remaining amount and consumed amount of fuel (e.g., gasoline), the fuel efficiency, the temperature of the engine 30, the capacity of a battery, the mode of the operating state, etc. The touch panel 6 accepts selection of the mode of the operating state by a user. The mode of the operating state includes an auto cruise mode of automatically controlling the boat speed, a mode of docking the boat 1 and moving the boat 1 away from the shore when docking the boat 1 and moving the boat 1 away from the shore, a trolling mode of moving the boat 1 at low speed, and a towing mode of towing water skis, a wakeboard, or the like. The touch panel 6 is in wired or wireless communication with the controller 51.

As shown in FIG. 4, the touch panel 6 displays an actual boat speed, the shift position, the rotational speed of the engine 30, a mode selection indication, etc., for example, in a normal mode. In the mode selection indication, a mode selection button 61 that selects an auto cruise mode is displayed, for example. As shown in FIG. 5, the touch panel 6 displays the actual boat speed, the shift position, the rotational speed of the engine 30, a target boat speed, an up button 62a, a down button 62b, a release button 63, etc., for example, in the auto cruise mode. The up button 62a and the down button 62b are examples of a "speed-up/speed-down command receiver" in the first preferred embodiment of the present invention, and the release button 63 is an example of a "mode off button" in the first preferred embodiment of the present invention.

The GPS receiver 7 measures the position and speed (actual boat speed) of the boat 1. The GPS receiver 7 detects the actual boat speed based on the time change of the detected position of the boat 1. The position and actual boat speed of the boat 1 detected by the GPS receiver 7 are transmitted to the controller 51.

The boat maneuvering system 100 includes the outboard motor 3, the remote control 5, the touch panel 6, and the GPS receiver 7, as shown in FIG. 3. The boat maneuvering system 100 controls the actual boat speed of the boat 1 in the auto cruise mode of automatically controlling the boat speed.

The controller 51 of the remote control 5 accepts the operation of the operation receiver 50 or operation of the touch panel 6 and sets the target boat speed of the boat 1. The ECU 34 of the outboard motor 3 controls the driving of the engine 30 based on the operation information and the target boat speed from the controller 51 of the remote control 5. Specifically, the ECU 34 controls the throttle actuator 31 and the shift actuator 32 such that the actual boat speed reaches the target boat speed.

The target boat speed in the auto cruise mode is set by the user. Specifically, the target boat speed in the auto cruise mode is varied by the user's operation of the up button 62a and the down button 62b, as shown in FIG. 5. The range of the target boat speed in the auto cruise mode that is set based on the position of the operated remote control 5 (operation receiver 50) is limited. For example, the target boat speed is set in a prescribed range approximate to a boat speed at a throttle opening degree corresponding to the position of the remote control 5 (operation receiver 50).

According to the first preferred embodiment, in the auto cruise mode of automatically controlling the boat speed, the ECU 34 performs intermittent control of switching the shift state alternately to a shift-in state and a neutral state by the shift actuator 32 when the throttle opening degree of the outboard motor 3 is an idling opening degree in the shift-in state and the detected actual boat speed is larger than the target boat speed for a first period of time (three seconds, for example) or more. When the user decreases the target boat speed so as to make the actual boat speed larger than the target boat speed or the actual boat speed is made larger than the target boat speed due to wind or waves, for example, the ECU 34 performs the intermittent control.

In the auto cruise mode, normal cruise control of securing the shift position in the shift-in state and controlling the actual boat speed by control of the output of the engine 30 and intermittent control of securing the output of the engine 30 in an idle state and controlling the actual boat speed by switching the shift position to the shift-in state and the neutral state are performed.

Figure 6:
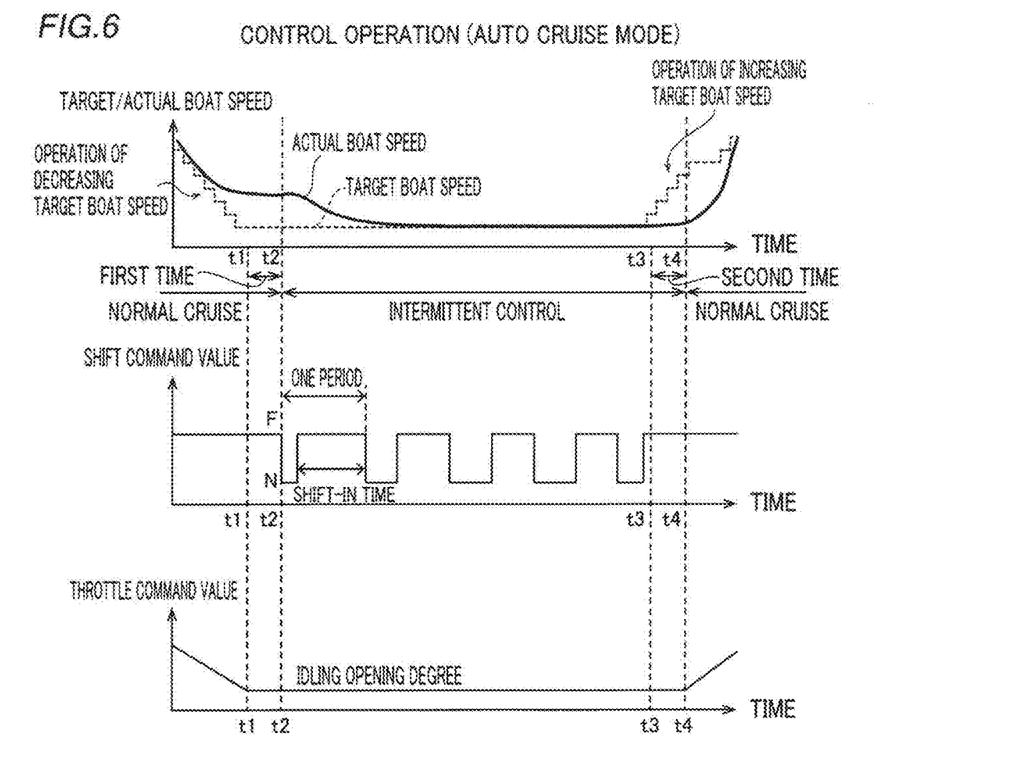
FIG. 6 is a diagram for illustrating a control operation in the auto cruise mode of the boat maneuvering system according to the first preferred embodiment of the present invention.

In an example shown in FIG. 6, in a state where the normal cruise control in the auto cruise mode is performed, the user decreases the target boat speed so as to make a throttle command value (a control signal value indicative of a throttle opening degree) smaller. At a time t1, the throttle command value reaches the idling opening degree, and the throttle opening degree becomes the idling opening degree. The actual boat speed continues to be larger than the target boat speed from the time t1 to a time t2 after the elapse of the first period of time. From the time t1 to the time t2, a shift command value (a control signal value indicative of a shift state) is F, and the shift position is in the shift-in state for forward movement. In this case, the ECU 34 switches the normal cruise control to the intermittent control at the time t2. In other words, the ECU 34 performs the intermittent control of switching the shift state alternately to the shift-in state and the neutral state by the shift actuator 32 from the time t2.

The ECU 34 adjusts a shift-in time such that the actual boat speed reaches the target boat speed during the intermittent control. As shown in FIG. 6, the time of the shift-in state in one period during the intermittent control is adjusted. One period denotes a time period from when the shift state is switched to the neutral state until when the shift state is switched to the shift-in state and then switched to the neutral state again. The shift-in time during the intermittent control is varied in a predetermined range. The shift-in time during the intermittent control is varied in a range from more than 0% of one period to less than 100% of one period, for example.

The ECU 34 performs control of gradually varying the shift-in time to a target shift-in time when performing the intermittent control. Specifically, the ECU 34 performs control of gradually decreasing the shift-in time from a maximum value to the target shift-in time when performing the intermittent control. In other words, the ECU 34 performs control of decreasing the shift-in time close to the target shift-in time for each period.

In other words, the ECU 34 performs control of decreasing the time of the shift-in state in one period when the actual boat speed is larger than the target boat speed during the intermittent control. On the other hand, the ECU 34 performs control of increasing the time of the shift-in state in one period when the actual boat speed is smaller than the target boat speed.

When the shift-in time is at least a certain value (the upper limit of the variable shift-in time) and the detected actual boat speed is smaller than the target boat speed for a second period of time (three seconds, for example) or more during the intermittent control, the ECU 34 cancels the intermittent control. The ECU 34 performs control of gradually changing the throttle opening degree to a target throttle opening degree when canceling the intermittent control. Specifically, the ECU 34 performs control of gradually increasing the throttle opening degree from the idling opening degree to the target throttle opening degree when canceling the intermittent control.

In the example shown in FIG. 6, in a state where the intermittent control in the auto cruise mode is performed, the user increases the target boat speed so as to increase the time of the shift-in state in one period in the intermittent control. At a time t3, the shift-in time becomes at least the certain value (the upper limit of the variable shift-in time, for example). The actual boat speed continues to be smaller than the target boat speed from the time t3 to a time t4 after the elapse of the second period of time. In this case, the ECU 34 switches the intermittent control to the normal cruise control at the time t4. The ECU 34 performs control of gradually increasing the throttle opening degree from the idling opening degree to the target throttle opening degree from the time t4.

Figure 7:
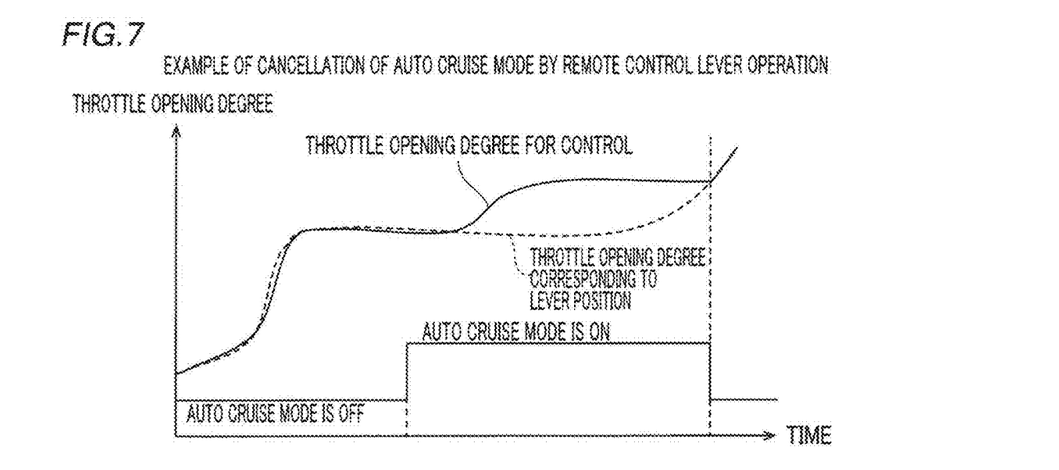
FIG. 7 is a diagram for illustrating an example of cancellation of the auto cruise mode of the boat maneuvering system according to the first preferred embodiment of the present invention.

When the remote control 5 (operation receiver 50) through which the user manipulates the throttle opening degree of the outboard motor 3 is operated more than a predetermined value, the auto cruise mode is canceled. As shown in FIG. 7, for example, the auto cruise mode is canceled when the remote control 5 (operation receiver 50) is moved in the auto cruise mode such that the throttle opening degree corresponding to the position of the operated remote control 5 reaches at least a throttle opening degree for control in the auto cruise mode. In the alternative, the auto cruise mode is canceled when the release button 63 is operated. When the auto cruise mode is canceled during the intermittent control, the throttle actuator 31 and the shift actuator 32 are controlled such that the throttle opening degree and the shift position are adjusted according to the position of the operated remote control 5. Specifically, the ECU 34 performs control of gradually increasing the throttle opening degree if a difference between the throttle opening degree corresponding to the position of the operated remote control 5 and an actual throttle opening degree is at least a predetermined value when the auto cruise mode is canceled during the intermittent control.

According to the first preferred embodiment, the ECU 34 performs the intermittent control of switching the shift state alternately to the shift-in state and the neutral state by the shift actuator 32 when an instruction to shift to the auto cruise mode of automatically controlling the boat speed is input in the neutral state. In other words, when the position of the operated remote control 5 is put into the auto cruise mode in the neutral state, the intermittent control is started. In this case, an initial shift-in time is set to a minimum. In this case, if the user increases the target boat speed, the shift-in time in the intermittent control is gradually increased.

The control process during automated cruising in the boat maneuvering system 100 according to the first preferred embodiment is now described with reference to a flowchart in FIG. 8.

Figure 8:
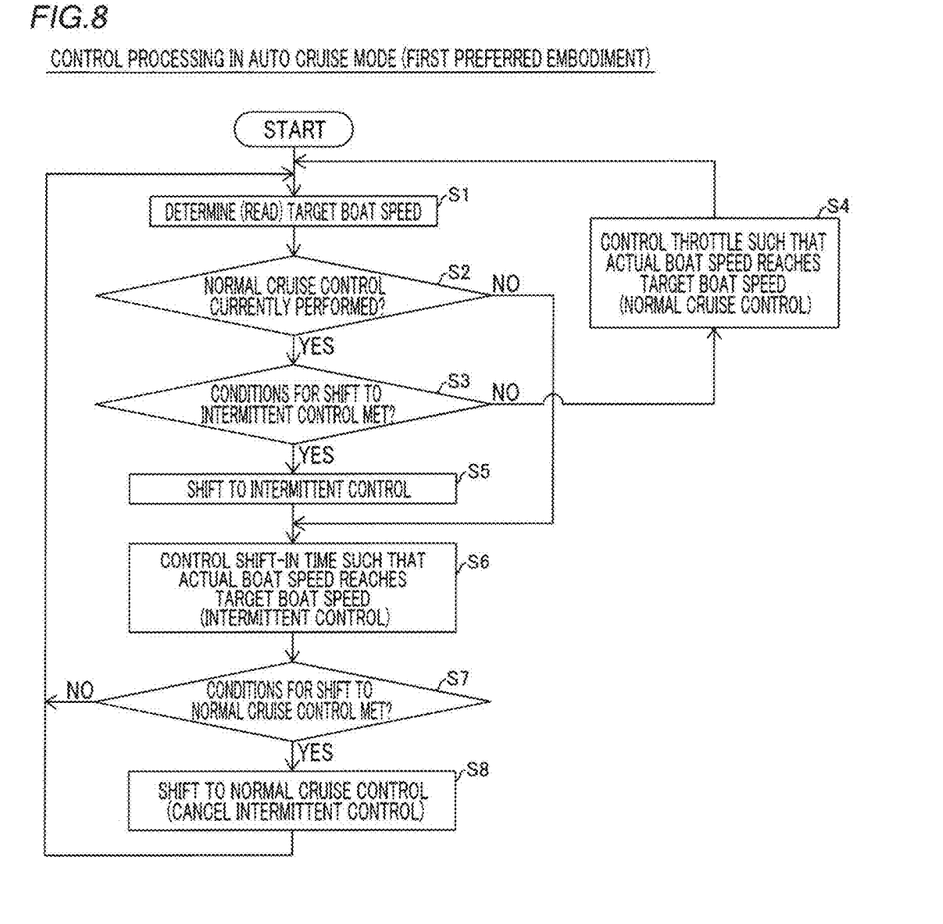
FIG. 8 is a flowchart for illustrating a control process in the auto cruise mode of the boat maneuvering system according to the first preferred embodiment of the present invention.

When the user selects the auto cruise mode, the target boat speed is determined (read) at step S1 in FIG. 8. In other words, the target boat speed set by the user is determined (read). At step S2, it is determined whether or not the normal cruise control is currently performed. In other words, it is determined whether or not the auto cruise mode is an auto cruise mode in which the shift state is put into forward movement or reverse movement. When it is determined that the normal cruise control is currently performed, the control process advances to step S3, and when it is determined that the normal cruise control is not currently performed (the intermittent control is currently performed), the control process advances to step S6.

At step S3, it is determined whether or not conditions for shifting to the intermittent control are met. In other words, it is determined whether or not the throttle opening degree is the idling opening degree (minimum opening degree) in the shift-in state and the detected actual boat speed is larger than the target boat speed for the first period of time or more. When it is determined that the conditions for shifting to the intermittent control are not met, the control process advances to step S4, and when it is determined that the conditions for shifting to the intermittent control are met, the control process advances to step S5.

At step S4, the throttle opening degree is controlled such that the actual boat speed reaches the target boat speed. Then, the control process returns to step S1.

When it is determined that the conditions for shifting to the intermittent control are met at step S3, a shift to the intermittent control is made at step S5. At step S6, the shift-in time is controlled such that the actual boat speed reaches the target boat speed. In other words, the shift-in time is controlled to be decreased when the actual boat speed is larger than the target boat speed. When the actual boat speed is smaller than the target boat speed, on the other hand, the shift-in time is controlled to be increased.

At step S7, it is determined whether or not conditions for shifting to the normal cruise control are met. In other words, it is determined whether or not the shift-in time is at least the certain value and the detected actual boat speed is smaller than the target boat speed for the second period of time or more. When it is determined that the conditions for shifting to the normal cruise control are not met, the control process returns to step S1, and when it is determined that the conditions for shifting to the normal cruise control are met, the control process advances to step S8.

At step S8, a shift to the normal cruise control is made. Then, the control process returns to step S1.

According to the first preferred embodiment of the present invention, the following advantageous effects are obtained.

According to the first preferred embodiment of the present invention, the boat maneuvering system 100 is provided with the ECU 34 that performs the intermittent control of switching the shift state alternately to the shift-in state and the neutral state by the shift actuator 32 when the throttle opening degree of the outboard motor 3 is the idling opening degree in the shift-in state and the detected actual boat speed is larger than the target boat speed for the first period of time or more in the auto cruise mode of automatically controlling the boat speed. Thus, even when the target boat speed is less than a boat speed at the idling opening degree in the auto cruise mode requiring no continuous boat maneuvering operation of the user, the boat speed is controlled, and hence it is not necessary for the user to perform an operation of subtly changing the setting at low speed. Consequently, the boat speed is easily and subtly controlled at low speed. Thus, in the auto cruise mode, the boat speed is automatically controlled in a wide range from high speed to extremely low speed. Furthermore, the intermittent control is performed when the detected actual boat speed is larger than the target boat speed for the first period of time or more, and hence repetition of execution and cancellation of the intermittent control (chattering) is significantly reduced or prevented when the actual boat speed is slightly increased and decreased in the vicinity of the target boat speed.

According to the first preferred embodiment of the present invention, during the intermittent control, the ECU 34 adjusts the shift-in time such that the actual boat speed reaches the target boat speed. Thus, propulsion power is controlled by adjusting a ratio of the shift-in time and the neutral time during the intermittent control, and hence the boat speed less than the boat speed at the idling opening degree is accurately controlled.

According to the first preferred embodiment of the present invention, the intermittent control is canceled when the shift-in time is at least the certain value and the detected actual boat speed is smaller than the target boat speed for the second period of time or more during the intermittent control. Thus, the intermittent control is canceled when the detected actual boat speed is smaller than the target boat speed for the second period of time or more, and hence frequent repetition of execution and cancellation of the intermittent control (chattering) is significantly reduced or prevented when the actual boat speed is slightly increased and decreased in the vicinity of the target boat speed.

According to the first preferred embodiment of the present invention, the ECU 34 performs control of gradually varying the shift-in time to the target shift-in time when performing the intermittent control. Thus, the actual boat speed is gradually changed, and hence the actual boat speed is smoothly brought close to the target boat speed.

According to the first preferred embodiment of the present invention, the ECU 34 performs control of gradually decreasing the shift-in time from the maximum value to the target shift-in time when performing the intermittent control. Thus, the actual boat speed is gradually decreased to the target boat speed so as to be smoothly brought close to the target boat speed.

According to the first preferred embodiment of the present invention, the ECU 34 performs control of gradually changing the throttle opening degree to the target throttle opening degree when canceling the intermittent control. Thus, the actual boat speed is gradually changed when the intermittent control is canceled, and hence the actual boat speed is smoothly brought close to the target boat speed.

According to the first preferred embodiment of the present invention, the ECU 34 performs control of gradually increasing the throttle opening degree from the idling opening degree to the target throttle opening degree when canceling the intermittent control. Thus, when the intermittent control is canceled, the actual boat speed is gradually increased to or close to the target boat speed.

According to the first preferred embodiment of the present invention, the target boat speed in the auto cruise mode is set by the user's operation. Thus, the boat travels at a boat speed desired by the user in the auto cruise mode.

According to the first preferred embodiment of the present invention, the target boat speed set by the user's operation in the auto cruise mode is variable by the user's operation of the up button 62a and the down button 62b. Thus, the target boat speed in the auto cruise mode is easily varied by the operation of the up button 62a and the down button 62b.

According to the first preferred embodiment of the present invention, the range of the target boat speed in the auto cruise mode that is set based on the position of the operated remote control 5 through which the throttle opening degree of the outboard motor 3 is manipulated is limited. Thus, a rapid fluctuation in the boat speed is significantly reduced or prevented when the auto cruise mode is canceled.

According to the first preferred embodiment of the present invention, the actual boat speed is detected based on the position of the boat detected by the GPS receiver 7. Thus, the actual boat speed is accurately detected by the GPS receiver 7.

According to the first preferred embodiment of the present invention, the auto cruise mode is canceled when the remote control 5 through which the throttle opening degree of the outboard motor 3 is manipulated is operated more than the predetermined value or the release button 63 is operated. Thus, the auto cruise mode is easily canceled by the operation of the remote control 5 or the operation of the release button 63.

According to the first preferred embodiment of the present invention, the ECU 34 controls the throttle actuator 31 and the shift actuator 32 to adjust the throttle opening degree and the shift position according to the position of the operated remote control 5 when the auto cruise mode is canceled during the intermittent control. Thus, a quick shift to control of the boat speed according to the position of the operated remote control 5 is made when the auto cruise mode is canceled during the intermittent control.

According to the first preferred embodiment of the present invention, the ECU 34 performs control of gradually increasing the throttle opening degree if the difference between the throttle opening degree corresponding to the position of the operated remote control 5 and the actual throttle opening degree is at least the predetermined value when the auto cruise mode is canceled during the intermittent control. Thus, a rapid fluctuation in the boat speed is significantly reduced or prevented when the auto cruise mode is canceled during the intermittent control.

Second Preferred Embodiment

A second preferred embodiment of the present invention is now described with reference to FIGS. 9 to 11. In the second preferred embodiment, intermittent control for a forward movement direction and a reverse movement direction is performed, unlike the first preferred embodiment in which the intermittent control for the forward movement direction is performed.

Figure 9:
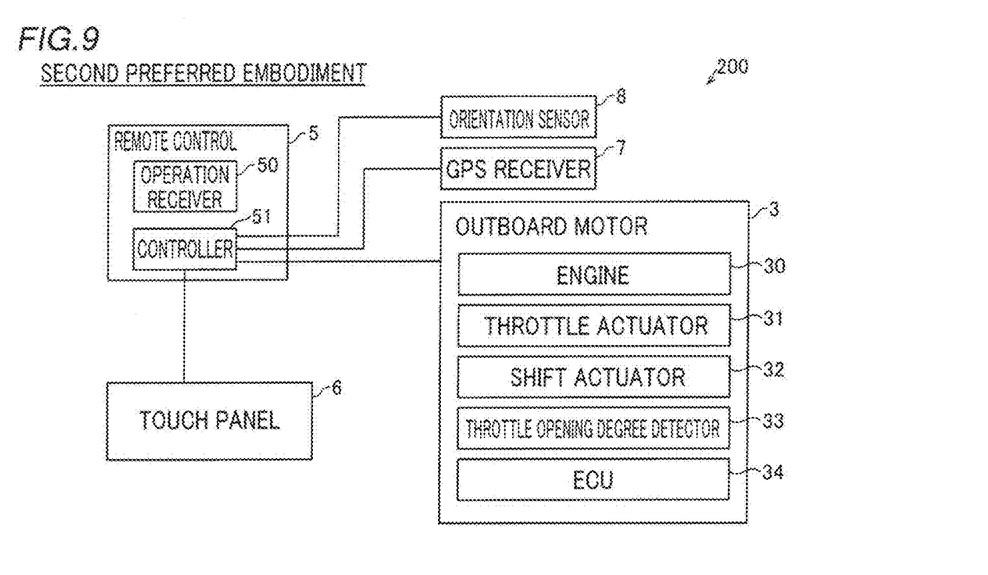
FIG. 9 is a block diagram schematically showing a boat maneuvering system according to a second preferred embodiment of the present invention.

A boat maneuvering system 200 according to the second preferred embodiment includes an outboard motor 3, a remote control 5, a touch panel 6, a GPS receiver 7, and an orientation sensor 8, as shown in FIG. 9. The boat maneuvering system 200 controls the actual boat speed of a boat 1 in an auto cruise mode of automatically controlling a boat speed. The outboard motor 3 includes an engine 30, a throttle actuator 31, a shift actuator 32, a throttle opening degree detector 33, and an ECU (engine control unit) 34. The remote control 5 includes an operation receiver 50 and a controller 51. The outboard motor 3 is an example of a "propulsion device" in the second preferred embodiment of the present invention. The GPS receiver 7 is an example of an "actual boat speed detector" in the second preferred embodiment of the present invention, and the controller 51 is an example of a "target boat speed selector" in the second preferred embodiment of the present invention. The shift actuator 32 is an example of a "shift actuator" or a "shift position detector" in the second preferred embodiment of the present invention. The ECU 34 is an example of an "actuator controller" in the second preferred embodiment of the present invention.

The orientation sensor 8 detects the direction (orientation) of the bow of the boat 1. The orientation sensor 8 is provided in a front portion of a boat body 2. The orientation of the boat 1 detected by the orientation sensor 8 is transmitted to the controller 51. An actual boat speed measured by the GPS receiver 7, the movement direction of the boat 1 with respect to the bow based on the orientation detected by the orientation sensor 8, and the movement speed of the boat 1 in the movement direction are acquired.

According to the second preferred embodiment, in the auto cruise mode of automatically controlling the boat speed, the ECU 34 performs intermittent control of switching a shift state alternately to a shift-in state and a neutral state by the shift actuator 32 when the throttle opening degree of the outboard motor 3 is an idling opening degree in the shift-in state and the detected actual boat speed is larger than the target boat speed for a first period of time (three seconds, for example) or more. When a user decreases the target boat speed so as to make the actual boat speed larger than the target boat speed or the actual boat speed is made larger than the target boat speed due to wind, waves, or water flow, for example, the ECU 34 performs the intermittent control.

Figure 10:
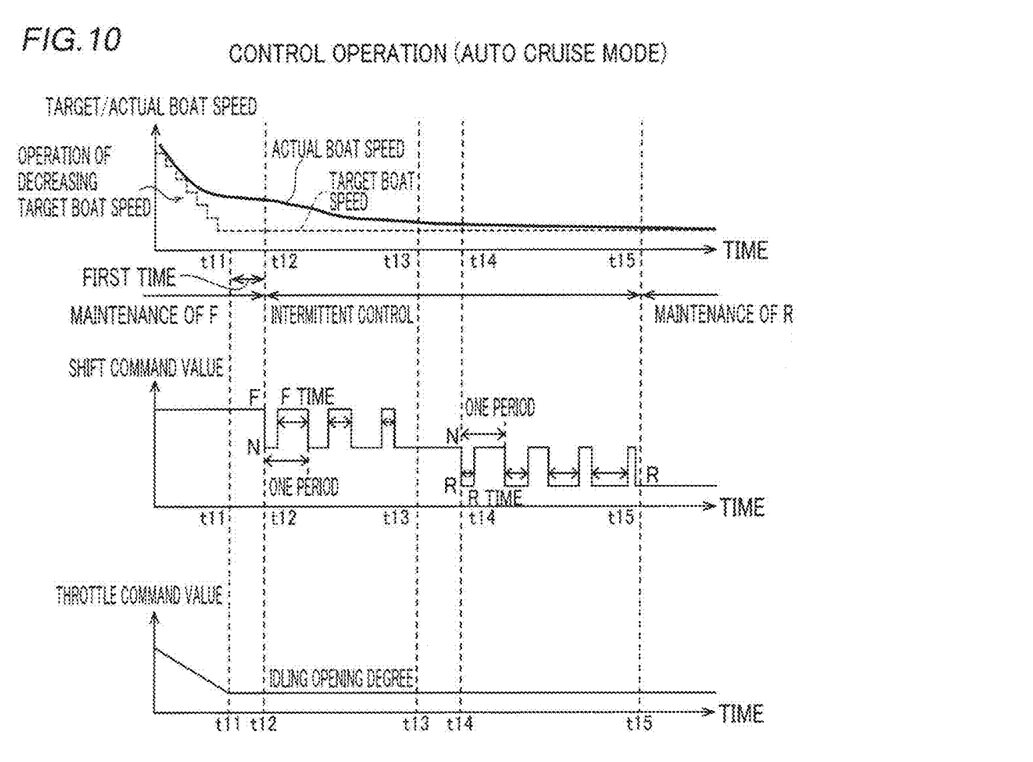
FIG. 10 is a diagram for illustrating a control operation in an auto cruise mode of the boat maneuvering system according to the second preferred embodiment of the present invention.

In an example shown in FIG. 10, in a state where normal cruise control in the auto cruise mode is performed, the user decreases the target boat speed so as to make a throttle command value smaller. At a time t11, the throttle command value reaches the idling opening degree, and the throttle opening degree becomes the idling opening degree. The actual boat speed continues to be larger than the target boat speed from the time t11 to a time t12 after the elapse of the first period of time. From the time t11 to the time t12, the shift command value is F, and the shift position is in the shift-in state for the forward movement direction. In this case, the ECU 34 switches the normal cruise control to the intermittent control at the time t12. In other words, the ECU 34 performs the intermittent control of switching the shift state alternately to the shift-in state and the neutral state by the shift actuator 32 from the time t12.

According to the second preferred embodiment, the ECU 34 performs control of switching alternately between the shift-in state for the forward movement direction or the shift-in state for the reverse movement direction and the neutral state in the intermittent control. Specifically, the ECU 34 switches the shift state to the reverse movement direction if the actual boat speed in the forward movement direction is larger than the target boat speed when performing the intermittent control of switching alternately between the shift-in state for the forward movement direction and the neutral state, or performing control of continuing the neutral state. The ECU 34 continues the shift-in state for the reverse movement direction if the actual boat speed in the forward movement direction is larger than the target boat speed even when switching the shift state to the reverse movement direction and performing the intermittent control of switching alternately between the shift-in state for the reverse movement direction and the neutral state. The forward movement direction is an example of a "first direction" in the second preferred embodiment of the present invention, and the reverse movement direction is an example of a "second direction" in the second preferred embodiment of the present invention.

The ECU 34 switches the shift state to the neutral state or the forward movement direction if the actual boat speed in the forward movement direction is smaller than the target boat speed when switching the shift state to the reverse movement direction. According to the second preferred embodiment, the target boat speed is able to be set to a value for the forward movement direction, zero, and a value for the reverse movement direction. In other words, the target boat speed is able to be set to a positive value, zero, and a negative value for the forward movement direction.

The ECU 34 adjusts a shift-in time such that the actual boat speed reaches the target boat speed during the intermittent control. As shown in FIG. 10, the time of the shift-in state in one period during the intermittent control is adjusted. One period denotes a time period from when the shift state is switched to the neutral state until when the shift state is switched to the shift-in state and then switched to the neutral state again. The shift-in time during the intermittent control is varied in a predetermined range. The shift-in time during the intermittent control is varied in a range from more than −100% of one period to less than 100% of one period, for example. When the shift-in time is a negative value, the intermittent control of switching alternately between the shift-in state for the reverse movement direction and the neutral state is performed. When the shift-in time is a positive value, on the other hand, the intermittent control of switching alternately between the shift-in state for the forward movement direction and the neutral state is performed.

In the example shown in FIG. 10, in the shift-in state for the forward movement direction in the auto cruise mode, the shift-in time for the forward movement direction is gradually decreased after a switch to the intermittent control is made at the time t12, and the actual boat speed is brought close to the target boat speed. When the shift-in time reaches zero at a time t13, the shift state is continuously in the neutral state.

If the actual boat speed is still larger than the target boat speed, the intermittent control of switching alternately between the shift-in state for the reverse movement direction and the neutral state is performed at a time t14. In this case, the shift-in time for the reverse movement direction is gradually increased, and the actual boat speed is brought close to the target boat speed. If the actual boat speed is still larger than the target boat speed, the shift state is continuously in the shift-in state for the reverse movement direction at a time t15.

The control process during automated cruise in the boat maneuvering system 200 according to the second preferred embodiment is now described with reference to a flowchart in FIG. 11.

Figure 11:
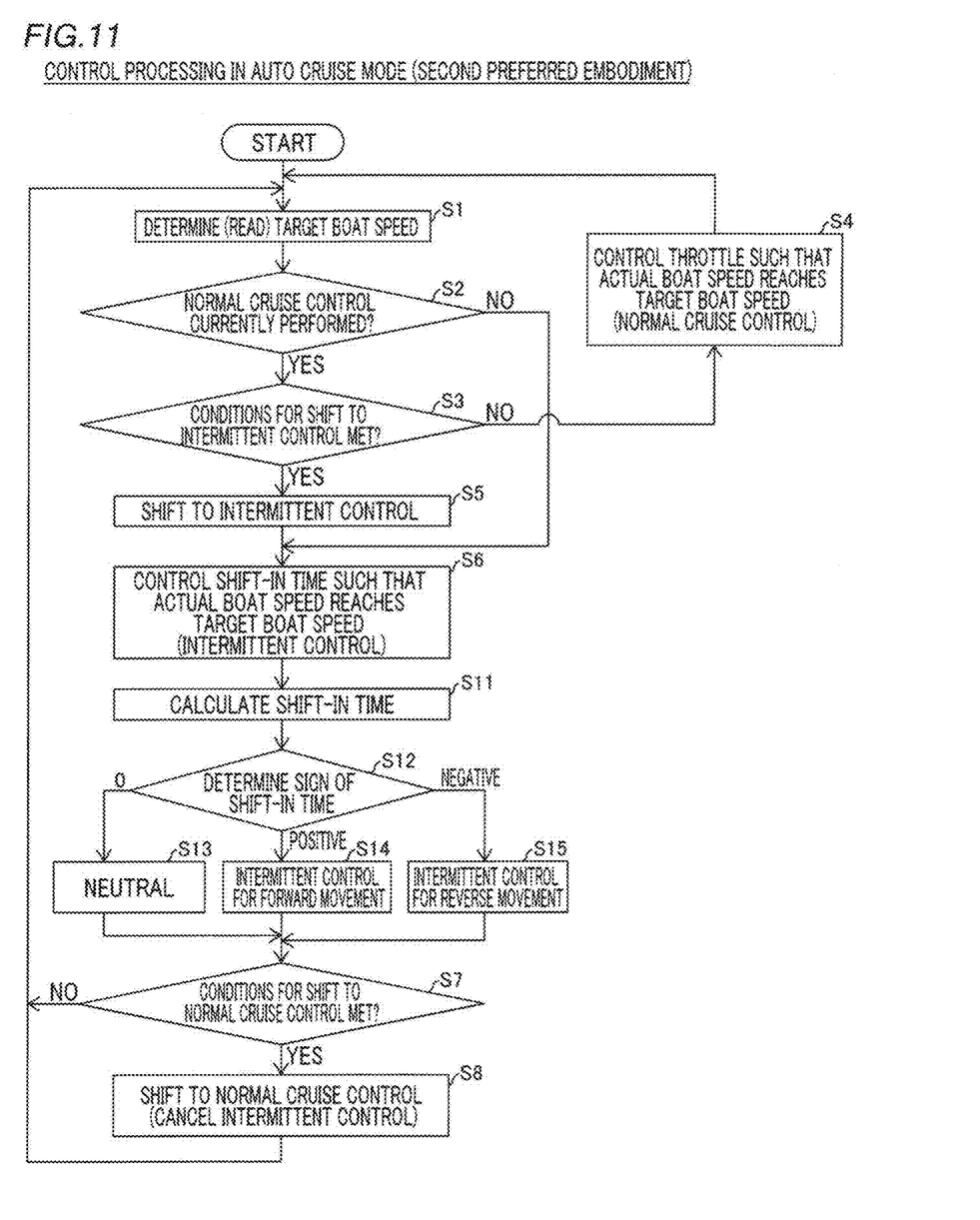
FIG. 11 is a flowchart for illustrating a control process in the auto cruise mode of the boat maneuvering system according to the second preferred embodiment of the present invention.

According to the second preferred embodiment, the shift-in time is calculated at step S11 after step S6 in FIG. 11. Specifically, the shift-in time is increased or decreased based on a difference between the target boat speed and the actual boat speed. When (target boat speed–actual boat speed) is larger than 0, for example, a value corresponding to the difference between the target boat speed and the actual boat speed is added to the current shift-in time. When (target boat speed–actual boat speed) is smaller than zero, on the other hand, a value corresponding to the difference between the target boat speed and the actual boat speed is subtracted from the current shift-in time.

At step S12, the sign of the shift-in time calculated at step S11 is determined. When the shift-in time is zero, the control process advances to step S13, when the shift-in time is positive (larger than zero), the control process advances to step S14, and when the shift-in time is negative (smaller than zero), the control process advances to step S15.

At step S13, the neutral state is continued. At step S14, the intermittent control for the forward movement direction is performed. In other words, the control of switching alternately between the shift-in state for the forward movement direction and the neutral state is performed. At step S15, the intermittent control for the reverse movement direction is performed. In other words, the control of switching alternately between the shift-in state for the reverse movement direction and the neutral state is performed.

After each of step S13, step S14, and step S15, the control process advances to step S7. The process in steps S1 to S8 is similar to the process according to the first preferred embodiment shown in FIG. 8.

The remaining structure of the second preferred embodiment is preferably similar to that of the above first preferred embodiment.

According to the second preferred embodiment of the present invention, the following advantageous effects are obtained.

According to the second preferred embodiment of the present invention, the boat maneuvering system 200 is provided with the ECU 34 that performs the intermittent control of switching the shift state alternately to the shift-in state and the neutral state by the shift actuator 32 when the throttle opening degree of the outboard motor 3 is the idling opening degree in the shift-in state and the detected actual boat speed is larger than the target boat speed for the first period of time or more in the auto cruise mode of automatically controlling the boat speed, similarly to the first preferred embodiment. Thus, the boat speed is easily and subtly controlled at low speed.

According to the second preferred embodiment of the present invention, the ECU 34 performs the control of switching alternately between the shift-in state for the forward movement direction or the shift-in state for the reverse movement direction and the neutral state in the intermittent control. Thus, even when the actual boat speed is larger than the target boat speed due to water flow, wind, or the like in the forward movement direction, the propulsive direction of the boat 1 is set to the reverse movement direction, and hence the boat speed is accurately controlled.

According to the second preferred embodiment of the present invention, the ECU 34 switches the shift state to the reverse movement direction if the actual boat speed in the forward movement direction is larger than the target boat speed when performing the intermittent control of switching alternately between the shift-in state for the forward movement direction and the neutral state, or performing control of continuing the neutral state. Thus, when the propulsion power of the boat 1 in the forward movement direction is decreased but the actual boat speed is still larger than the target boat speed, the propulsive direction of the boat 1 is set to the reverse movement direction, and hence the boat speed is easily and accurately controlled.

According to the second preferred embodiment of the present invention, the ECU 34 continues the shift-in state for the reverse movement direction if the actual boat speed in the forward movement direction is larger than the target boat speed even when switching the shift state to the reverse movement direction and performing the intermittent control of switching alternately between the shift-in state for the reverse movement direction and the neutral state. Thus, the propulsion power of the boat 1 in the reverse movement direction is increased by switching the intermittent control to the control of continuing the shift-in state, and hence the boat speed is accurately controlled even when the influence of water flow, wind, or the like in the forward movement direction is large.

According to the second preferred embodiment of the present invention, the ECU 34 switches the shift state to the neutral state or the forward movement direction if the actual boat speed in the forward movement direction is smaller than the target boat speed when switching the shift state to the reverse movement direction. Thus, the propulsion power of the boat 1 in the reverse movement direction is eliminated when the direction or magnitude of water flow or wind is changed, and hence the boat speed is accurately controlled according to changing circumstances such as the water flow and the wind.

According to the second preferred embodiment of the present invention, the target boat speed is able to be set to the value for the forward movement direction, zero, and the value for the reverse movement direction. Thus, the degree of freedom of the setting of the target boat speed is increased as compared with the case where the target boat speed is able to be set only to the value for the forward movement direction.

The remaining effects of the second preferred embodiment are similar to those of the above first preferred embodiment.

The preferred embodiments of the present invention described above are illustrative in all points and not restrictive. The extent of the present invention is not defined by the above description of the preferred embodiments but by the scope of claims, and all modifications within the meaning and range equivalent to the scope of claims are further included.

For example, while the outboard motor mounted on the exterior of the boat body is preferably used as the propulsion device in each of the first and second preferred embodiments described above, the present invention is not restricted to this. As the propulsion device, an inboard motor mounted on the interior of the boat body or an inboard/outboard (stern drive) motor provided on the interior and exterior of the boat body may alternatively be used.

While the controller provided in the remote control that controls the throttle opening degree of the propulsion device is preferably used as the target boat speed selector in each of the first and second preferred embodiments described above, the present invention is not restricted to this. The target boat speed selector may alternatively be provided in a location other than the remote control. The target boat speed selector may be provided in the propulsion device or another device in the boat body, for example.

While the ECU provided in the outboard motor (propulsion device) is preferably used as the actuator controller in each of the first and second preferred embodiments described above, the present invention is not restricted to this. The actuator controller may alternatively be provided in a device other than the propulsion device.

While the first period of time for shifting to the intermittent control is preferably three seconds and the second period of time for cancellation of the intermittent control is preferably three seconds in each of the first and second preferred embodiments described above, the present invention is not restricted to this. According to a preferred embodiment of the present invention, the first period of time and the second period of time may alternatively be made different from each other, or the first period of time and the second period of time may alternatively be a time other than three seconds.

While a single outboard motor is preferably provided as the propulsion device in the boat in each of the first and second preferred embodiments described above, the present invention is not restricted to this. According to a preferred embodiment of the present invention, a plurality of propulsion devices may alternatively be provided on the boat.

While the target boat speed in the auto cruise mode is preferably set and changed by the up button and the down button on the touch panel in each of the first and second preferred embodiments described above, the present invention is not restricted to this. According to a preferred embodiment of the present invention, the target boat speed in the auto cruise mode may alternatively be set and changed by a button or a command receiver on a device other than the touch panel. The target boat speed may be set and changed by a speed-up/speed-down command receiver such as a button provided on the remote control, for example.

While the actual boat speed of the boat is preferably detected by the GPS receiver in each of the first and second preferred embodiments described above, the present invention is not restricted to this. According to a preferred embodiment of the present invention, the actual boat speed of the boat may alternatively be detected by a device other than the GPS receiver. The actual boat speed of the boat may be detected from a difference between static pressure and dynamic pressure by a pitot tube or from the rotational speed of a waterwheel by a waterwheel device, for example.

While the process operations performed by the ECU (actuator controller) are described using a flowchart in a flow-driven manner in which processes are performed in order along a process flow for the convenience of illustration in each of the first and second preferred embodiments described above, the present invention is not restricted to this. According to a preferred embodiment of the present invention, the processes performed by the actuator controller may alternatively be performed in an event-driven manner in which the processes are performed on an event basis. In this case, the processes performed by the actuator controller may be performed in a complete event-driven manner or in a combination of an event-driven manner and a flow-driven manner.

While the orientation sensor detects the orientation of the boat in the second preferred embodiment described above, the present invention is not restricted to this. According to a preferred embodiment of the present invention, GPS receivers may alternatively be provided in a front portion and a rear portion of the boat and detect the orientation of the boat based on the measurements of the two GPS receivers arranged in the front and rear portions.

While the first direction is preferably the forward movement direction and the second direction is preferably the reverse movement direction in the second preferred embodiment described above, the present invention is not restricted to this. According to a preferred embodiment of the present invention, the first direction and the second direction may alternatively be the left direction and the right direction of the boat, respectively, or respective oblique directions of the boat opposite to each other, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A boat maneuvering system comprising:
   a target boat speed selector that sets a target boat speed of a boat;
   an actual boat speed detector that detects an actual boat speed of the boat;
   a throttle actuator that changes a throttle opening degree of a propulsion device;
   a shift actuator that switches a shift state of the propulsion device;
   a shift position detector that detects a shift position of the propulsion device;
   a throttle opening degree detector that detects the throttle opening degree of the propulsion device; and
   an actuator controller configured or programmed to control the throttle actuator and the shift actuator such that the actual boat speed reaches the target boat speed; wherein
   the actuator controller is configured or programmed to perform intermittent control of switching the shift state alternately to a shift-in state and a neutral state by the shift actuator when the throttle opening degree of the propulsion device is an idling opening degree in the shift-in state and a state in which the actual boat speed is larger than the target boat speed is generated and continually detected for a first period of time or more in an auto cruise mode of automatically controlling a boat speed.

2. The boat maneuvering system according to claim 1, wherein during the intermittent control, the actuator controller is configured or programmed to adjust a shift-in time such that the actual boat speed reaches the target boat speed.

3. The boat maneuvering system according to claim 2, wherein the intermittent control is canceled when the shift-in time is at least a certain value and the detected actual boat speed is smaller than the target boat speed for a second period of time or more during the intermittent control.

4. The boat maneuvering system according to claim 2, wherein the actuator controller is configured or programmed to perform control of gradually varying the shift-in time to a target shift-in time when performing the intermittent control.

5. The boat maneuvering system according to claim 4, wherein the actuator controller is configured or programmed to perform control of gradually decreasing the shift-in time from a maximum value to the target shift-in time when performing the intermittent control.

6. The boat maneuvering system according to claim 1, wherein the actuator controller is configured or programmed to perform control of gradually changing the throttle opening degree to a target throttle opening degree when canceling the intermittent control.

7. The boat maneuvering system according to claim 6, wherein the actuator controller is configured or programmed to perform control of gradually increasing the throttle opening degree from the idling opening degree to the target throttle opening degree when canceling the intermittent control.

8. The boat maneuvering system according to claim 1, wherein the target boat speed in the auto cruise mode is set by an operation performed by a user.

9. The boat maneuvering system according to claim 8, wherein the target boat speed set by the user in the auto cruise mode is variable by the user operating a speed-up/speed-down command receiver.

10. The boat maneuvering system according to claim 8, wherein a range of the target boat speed in the auto cruise mode set based on a position of a remote control through which the throttle opening degree of the propulsion device is manipulated is limited.

11. The boat maneuvering system according to claim 1, wherein the actual boat speed detector includes a GPS receiver and detects the actual boat speed based on a position of the boat detected by the GPS receiver.

12. The boat maneuvering system according to claim 1, wherein the auto cruise mode is canceled when a remote control, through which the throttle opening degree of the propulsion device is manipulated, is operated more than a predetermined value, or a mode off button is operated.

13. The boat maneuvering system according to claim 12, wherein the actuator controller is configured or programmed to control the throttle actuator and the shift actuator to adjust the throttle opening degree and the shift position according to a position of a remote control when the auto cruise mode is canceled during the intermittent control.

14. The boat maneuvering system according to claim 13, wherein the actuator controller is configured or programmed to perform control of gradually increasing the throttle opening degree when a difference between the throttle opening degree, corresponding to the position of the remote control, and an actual throttle opening degree is at least a predetermined value when the auto cruise mode is canceled during the intermittent control.

15. A boat maneuvering system comprising:
a target boat speed selector that sets a target boat speed of a boat;
an actual boat speed detector that detects an actual boat speed of the boat;
a throttle actuator that changes a throttle opening degree of a propulsion device;
a shift actuator that switches a shift state of the propulsion device;
a shift position detector that detects a shift position of the propulsion device;
a throttle opening degree detector that detects the throttle opening degree of the propulsion device; and
an actuator controller configured or programmed to control the throttle actuator and the shift actuator such that the actual boat speed reaches the target boat speed; wherein
the actuator controller is configured or programmed to perform intermittent control of switching the shift state alternately to a shift-in state and a neutral state by the shift actuator when the neutral state is set and an operating state is changed from a normal mode to an auto cruise mode of automatically controlling a boat speed.

16. The boat maneuvering system according to claim 15, wherein the actuator controller is configured or programmed to perform control of switching alternately between the shift-in state in a first direction or the shift-in state in a second direction opposite to the first direction and the neutral state in the intermittent control.

17. The boat maneuvering system according to claim 16, wherein the actuator controller is configured or programmed to switch the shift state to the second direction when the actual boat speed in the first direction is larger than the target boat speed when performing the intermittent control of switching alternately between the shift-in state in the first direction and the neutral state, or performing control of continuing the neutral state.

18. The boat maneuvering system according to claim 17, wherein the actuator controller is configured or programmed to continue the shift-in state in the second direction when the actual boat speed in the first direction is larger than the target boat speed even when switching the shift state to the second direction and performing the intermittent control of switching alternately between the shift-in state in the second direction and the neutral state.

19. The boat maneuvering system according to claim 17, wherein the actuator controller is configured or programmed to switch the shift state to the neutral state or the first direction when the actual boat speed in the first direction is smaller than the target boat speed when switching the shift state to the second direction.

20. The boat maneuvering system according to claim 15, wherein the target boat speed is set to a value for a first direction that is a forward movement direction, zero, and a value for a second direction that is a reverse movement direction.

* * * * *